United States Patent [19]

Dale et al.

[11] Patent Number: 5,879,928
[45] Date of Patent: Mar. 9, 1999

[54] COMPOSITION FOR THE TREATMENT FOR MUNICIPAL AND INDUSTRIAL WASTE-WATER

[75] Inventors: Parker Dale, Newport Beach; John E. Hill, Irvine, both of Calif.

[73] Assignee: Neozyme International, Inc., Aliso Viejo, Calif.

[21] Appl. No.: 726,717

[22] Filed: Oct. 7, 1996

Related U.S. Application Data

[60] Provisional application No. 60/007,088, Oct. 31, 1995.
[51] Int. Cl.⁶ .............................. D06M 16/00; C12N 1/16; C12N 1/18
[52] U.S. Cl. .................. 435/264; 435/255.1; 435/255.2; 435/262; 435/262.5
[58] Field of Search ............................ 435/255.1, 255.2, 435/262, 262.5, 264, 224

[56] References Cited

U.S. PATENT DOCUMENTS

| | | | |
|---|---|---|---|
| 2,424,049 | 7/1947 | Parker et al. ................................ | 134/3 |
| 3,404,068 | 10/1968 | Batistoni .................................. | 71/64.1 |
| 3,519,570 | 7/1970 | McCarty .................................. | 510/392 |
| 3,635,797 | 1/1972 | Battistoni et al. ....................... | 210/632 |
| 3,880,739 | 4/1975 | Leavitt ..................................... | 435/147 |
| 4,009,119 | 2/1977 | Poschmann et al. ..................... | 252/358 |
| 4,127,447 | 11/1978 | Griffith et al. ........................... | 435/162 |
| 4,541,944 | 9/1985 | Sanderson ................................ | 510/371 |
| 4,741,835 | 5/1988 | Jacques et al. .......................... | 210/708 |
| 4,822,490 | 4/1989 | Dyadechko et al. ..................... | 210/611 |
| 4,963,632 | 10/1990 | Bock et al. .............................. | 526/540 |
| 5,041,236 | 8/1991 | Carpenter et al. ...................... | 510/131 |
| 5,071,765 | 12/1991 | Wiatr ....................................... | 435/264 |
| 5,075,008 | 12/1991 | Chigusa et al. ......................... | 210/610 |
| 5,108,746 | 4/1992 | Rho et al. ............................... | 424/94.2 |
| 5,128,262 | 7/1992 | Lindoerfer et al. ..................... | 435/264 |
| 5,133,892 | 7/1992 | Chun et al. .............................. | 510/224 |
| 5,139,945 | 8/1992 | Liu .......................................... | 435/232 |
| 5,160,488 | 11/1992 | Stillman .................................. | 71/64.1 |
| 5,227,067 | 7/1993 | Runyon .................................... | 210/606 |
| 5,326,477 | 7/1994 | Fugua et al. ............................. | 210/632 |
| 5,352,386 | 10/1994 | Rahman et al. ......................... | 510/496 |
| 5,352,387 | 10/1994 | Rahman et al. ......................... | 510/496 |
| 5,358,656 | 10/1994 | Humphreys et al. .................... | 510/433 |
| 5,364,789 | 11/1994 | Guinn et al. ............................. | 435/262.5 |
| 5,369,031 | 11/1994 | Middleditch et al. ................... | 435/262.5 |
| 5,372,944 | 12/1994 | Swanson ................................. | 435/252.1 |
| 5,385,685 | 1/1995 | Humphreys et al. .................... | 510/119 |
| 5,389,279 | 2/1995 | Au et al. .................................. | 424/70.19 |
| 5,407,577 | 4/1995 | Nghiem .................................... | 210/606 |
| 5,466,396 | 11/1995 | Madison et al. ......................... | 510/153 |
| 5,503,766 | 4/1996 | Kulperger ................................ | 510/383 |
| 5,520,835 | 5/1996 | Sivik et al. .............................. | 510/220 |
| 5,560,872 | 10/1996 | Rahman et al. ......................... | 510/392 |

OTHER PUBLICATIONS

M. Ueda, H. Koo, T. Wakida and Y. Yoshimura; "Cellulase Treatment of Cotton Fabrics Part II: Inhibitory Effect of Surfactants on Cellulase Catalytic Reaction", *Textile Res. J.*; 64(10); pp. 615–618; Oct. 1994.

*Biochemical Engineering Fundamentals*, Second Edition; James F. Bailey and David F. Ollis, Editors; Chap. 8.7.3 "Surface–Active Agents"; p. 500.

Andrew Benedek and William J. Heideger; "Effects of Additives on Mass Transfer in Turbine Aeration", *Biotechnology and Bioengineering*; vol. XIII; pp. 663–684 (1971).

*Bioprocess Engineering Principles*; Pauline M. Doran, Editor; "Mass Transfer"; pp. 196–207.

*Bioorganic Chemistry—A Chemical Approach to Enzyme Action*; Third Edition; Hermann Dugas; "Chap. 5.3 Membrane Chemistry and Micelles"; pp. 317–325

Paul C. Engelking; "Lifetmes of Metastable Microbubbles"; *The Journal of Physical Chemistry*; vol. 89,; No. 8; pp. 1520–1523; 1985 American Chemical Society.

W. Wesley Eckenfelder, Jr. and Edwin L. Barnhart; "The Effect of Organic Substances on the Transfer of Oxygen from Air Bubbles in Water"; *A.I. Ch. E Journal*; vol. 7, No. 4; Dec. 1961; pp. 631–634.

Michael V. Enzien, Donald L. Michelsen, Rober W. Peters, Jacques X. Bouillard and James R. Frank; "Enhanced In Situ Bioremediation Using Foams and Oil Aphrons"; *In Situ Aeration: Air Sparging, Bioventing, and Related Remediation Processes*; pp. 503–509.

Maria de Fátima, Santana Neves, Dino Zanette, Frank Quina, Méricles Tadeu Moretti and Faruk Nome; Origin of the Apparent Breakdown of the Pseudophase Ion–Exchange Model for Micellar Catalysis with Reactive Counterion Surfactants: *J. Phys. Chem.* 1989; vol. 93, No, 4; pp. 1502–1505.

Marios M. Fyrillas and Andrew J. Szeri; "Dissolution or growth of soluble spherical oscillation bubbles: the effect of surfactants"; *J. Fluid Mech.*; (1995); vol. 289; pp. 295–314.

Fikret Kaya, John A. Heitmann Jr. and Thomas W. Joyce; "Influence of surfactants on the enzymatic hydrolysis of xylan and cellulose"; *Tappi Journal*; Oct. 1995; vol. 78, No. 10; pp. 150–157.

Claire F. Komives, Daniel E. Osborne and Alan J. Russell; "Characterization of a Nonionic Surfactant Reversed Micellar system for Enzyme Catalysis",*J. Phys. Chem.*; 1994; vol. 98, No. 1; pp. 369–376.

Kazue Kurihara and Janos H. Fendler; "Electron–Transfer Catalysis by Surfactant Vesicle Stabilized Colloidal Platinum"; *J. Am. Chem. Soc.*; vol. 105, No. 19, 1983; pp. 6152–6153.

Timothy A. Longe, Jacques X. Bouillard and Donald L. Michelsen; "Use of Microbubble Dispersion for Soil Scouring"; *In Situ Aeration*; pp. 511–518.

(List continued on next page.)

*Primary Examiner*—Leon B. Lankford, Jr.
*Assistant Examiner*—Christopher R. Tate
*Attorney, Agent, or Firm*—Merchant, Gould, Smith, Edell, Welter & Schmidt

[57] ABSTRACT

A composition for the treatment of municipal and industrial waste-water. The composition comprises a yeast fermentation supernatant, preservatives and a non-ionic surfactant. In a preferred embodiment of the present invention the composition comprises a fermentation supernatant from a *Saccharomyces cerevisiae* culture, sodium benzoate, imidazolidinyl urea, diazolidinyl urea and a non-ionic surfactant.

5 Claims, No Drawings

OTHER PUBLICATIONS

Gail K. Masutani and Michael K. Stenstrom; "Dynamic Surface Tension Effects on Oxygen Transfer"; pp. 126–142.

Donald L. Michelsen, Ph.D., David A. Wallis, Ph.D. and Steven R. Lavinder; "In Situ Biodegradation of Dispersed Organics Using a Microdispersion of Air in Water"; *Site Remediation*; pp. 291–298.

Brian A. O'Palko and Donald L. Michelsen; "The Effects of a Microbubble Dispersion on the Performance of a POTW Dissolved Air Flotation System"; *47th Purdue University Industrial Waste Conference Proceedings*; pp. 327–336.

Felix Sebba; "An improved generator for micron-sized bubbles"; *Chemistry and Industry*; 4 Feb. 1995; pp. 91–92.

U. Tonellato; "Functional Micellar Catalysis"; *Solution Chemistry of Surfactants* vol. 2; pp. 541–558.

COMPOSITION FOR THE TREATMENT FOR MUNICIPAL AND INDUSTRIAL WASTE-WATER

RELATED APPLICATIONS

This application is based on Provisional Application Ser. No. 60/007,088 filed Oct. 31, 1995, which is incorporated herein by reference.

FIELD OF THE INVENTION

The present invention is directed at a biologically based composition for the treatment and remediation of municipal and industrial waste-water to reduce pollutants in the water, to increase the waters ability to support life and to deodorize the waste water.

BACKGROUND OF THE INVENTION

Since the passage of the Clean Water Act many industries have been required to institute treatment programs for the waste-water they generate before these waters are discharged into public drains and waterways. These programs often include on-site waste-water treatment processes, discharge into public treatment works or both.

Waste-water typically contains a wide variety of contaminants which must be removed prior to discharge of the waste-water into public waterways, such contaminants include: organic matter, such as proteins, carbohydrates and lipids; chemicals, such as pesticides, insecticides, heavy metals and fertilizers; and sewage. The waste-water is typically assessed in terms of its biochemical oxygen demand (BOD), total suspended solids (TSS) and dissolved oxygen (DO).

A number of processes have been developed which are directed at specific contaminants, for example: phenol oxidases and hydrogen peroxide have been used to decolorize pulp and paper mill waste-water (U.S. Pat. No. 5,407,577); enzymes from an atypical strain of Bacillus stearothermophilus have been used to degrade algal cell walls (U.S. Pat. No. 5,139,945); a combination of bacteria and enzymes have been used to improve the water quality of standing bodies of water (U.S. Pat. No. 5,227,067); cellulases have been used to digest wood/paper compositions (U.S. Pat. No. 5,326,477); *Xanthomonas maltophilia* and *Bacillus thuringiensis* have been used to degrade polar organic solvents (U.S. Pat. No. 5,369,031); yeast have been used to digest carbohydrate-containing waste-water (U.S. Pat. No. 5,075,008); a combination of β-glucanase, (α-amylase and proteases have been used to digest microbial slime (U.S. Pat. No. 5,071,765); and a combination of amylase, lipase and/or proteases have been used to digest colloidal material such as starch, grease, fat and protein (U.S. Pat. No. 5,882,059). However, each of these compositions are directed at only a specific contaminant and they do not address the variety of contaminants which are usually found in waste-water and polluted water. A composition described in U.S. Pat. No. 3,635,797 used a yeast fermentation composition to deodorize sewage ponds and degrade organic waste. However, this composition has been found to be unstable and yielded variable results from one batch to another.

It is desirable to provide a composition and method for the digestion and decontamination of a variety of pollutants which are typically found in waste-water.

SUMMARY OF THE INVENTION

The present invention is directed at a composition for use in the treatment of municipal and industrial waste-water. The composition comprises a yeast fermentation supernatant, preservatives and a non-ionic surfactant. In a preferred embodiment of the present invention the composition comprises a fermentation supernatant from a *Saccharomyces cerevisiae* culture, sodium benzoate, imidazolidinyl urea, diazolidinyl urea and a non-ionic surfactant.

DETAILED DESCRIPTION

The present invention is directed at a composition for the treatment of waste-water.

Oxidative biological and chemical processes in aqueous environments are limited by the low solubility of oxygen in water. This physical limitation is defined by Henry's Law. It states that when the temperature is kept constant, the amount of a gas that dissolves into a liquid is proportional to the pressure exerted by the gas on the liquid.

The solubility of oxygen in pure water is only about 10 parts per million (ppm) at ambient temperatures and at one atmosphere pressure. The composition of the present invention has been observed to increase oxygen in water above levels which would be anticipated by Henry's Law.

For most aerobic bioprocesses, whether a wastewater treatment system or a biotechnology fermentation, dissolved oxygen is quickly consumed so that replenishing it becomes the factor which limits the rate of the process. Therefore, the most critical component of a bioprocess design is the means for the mass transfer of oxygen into the liquid phase of the process. For an actively respiring culture of bacteria at a cell density of about $10^9$ cells/ml, oxygen in the liquid medium must be replaced about 12 times per minute to keep up with the oxygen demand of the bacteria.

Water is typically aerated by increasing the contact surfaces between the gaseous and liquid phases. This can be done either by introducing a source of oxygen into a bulk liquid phase or by flowing dispersed water through a bulk gaseous (air) phases. Regardless of whether the gaseous or liquid phases dominate the oxygenation process, the mass transfer of oxygen, or other gas, is accomplished by introducing gas bubbles into the liquid phase. The efficiency of gas-liquid mass transfer depends to a large extent on the characteristics of the bubbles. Bubble behavior strongly affects the following mass-transfer parameters:

Transfer of oxygen from the interior of the bubble to the gas-liquid interface;

Movement of oxygen across the gas-liquid interface; and

Diffusion of oxygen through the relatively stagnant liquid film surrounding the bubble.

It is of fundamental importance in the study of bubbles to understand the exchange of gases across the interface between the free state within the bubble and the dissolved state outside the bubble. It is generally agreed that the most important property of air bubbles in a bioprocess is their size. For a given volume of gas, more interfacial area (a) between the gas phase and liquid phase is provided if the gas is dispersed into many small bubbles rather than a few large ones. Small bubbles, 1–3 mm, have been shown to have the following beneficial properties not shared by larger bubbles:

Small gas bubbles rise more slowly than large bubbles, allowing more time for a gas to dissolve in the aqueous phase. This property is referred to as gas hold-up, concentrations of oxygen in water can be more than doubled beyond Henry's Law solubility limits. For example, after a saturation limit of 10 ppm oxygen is attained; at least another 10 ppm oxygen within small bubbles would be available to replenish the oxygen.

Once a bubble has been formed, the major barrier for oxygen transfer to the liquid phase is the liquid film surrounding the bubble. Biochemical engineering studies have concluded that transport through this film becomes the rate-limiting step in the complete process, and controls the overall mass-transfer rate. However, as bubbles become smaller, this liquid film decreases so that the transfer of gas into the bulk liquid phase is no longer impeded.

Surfactants in water can lead to the formation of very small bubbles, less than 1 mm in diameter. These small bubbles, referred to as microbubbles, are the result of the reduced surface tension at the interface between the gas/liquid interface caused by surfactants.

As large concentrations of gas are introduced into a solution such as by a chemical reaction or other mechanism, the liquid phase can become supersaturated if nucleation centers for the formation of bubbles are absent. At this point microbubbles can then form spontaneously, nucleating large bubble formation, and sweeping dissolved gases from the solution until supersaturation again occurred. In the presence of surfactants, it is likely that a larger portion of gas would remain in the solution as stable bubbles.

Microbubbles exposed to a dispersion of gas in a liquid show colloidal properties and are referred to as colloidal gas aphrons (CGA). CGA differ from ordinary gas bubbles in that they contain a distinctive shell layer consisting of a low concentration of a surfactant.

The composition of the present invention exhibits desirable properties associated with surfactant microbubbles. However, the microbubbles formed with the composition of the present invention appear to increase the mass transfer of oxygen in liquids. Without being bound by scientific theory, there are several possible explanations for this difference:

The earlier described surfactant microbubbles involved the use of pure synthetic surfactants that were either anionic or cationic. The surfactants formulated into the composition of the present invention are nonionic and are blended with biosurfactants which significantly alter the properties of bubble behavior.

The composition of the present invention requires a much lower concentration of surfactants for microbubble formation. It has been suggested that surfactant concentrations must approach the critical micelles concentration (CMS) of a surfactant system. In the composition of the present invention, microbubbles are formed below estimated CMCs for the surfactants used. This suggests that the composition of the present invention microbubbles are the result of aggregates of surfactant molecules with a loose molecular packing more favorable to gas mass transfer characteristics. A surface consisting of fewer molecules would be more gas permeable than a well-organized micelle containing gas.

In addition to surfactants, the composition of the present invention contains biologically derived catalysts. Both of these components tend to be amphiphilic, that is they have pronounced hydrophobic and hydrophilic properties. Amphiphilic molecules tend to cluster in water to form and allow molecular weight aggregates which (as surfactant concentrations increase) result in micelle formation at concentrations ranging from $10^{-2}$ to $10^{14}$M. Aggregates of these amphiphilic molecules are the nuclei for microbubble formation.

The composition of the present invention appears to increase oxygen levels in fluids. Without being bound by scientific theory, it is believed this effect can be explained by either or both of two mechanisms:

Increased mass transfer of gases resulting from the interactions of non-ionic surfactants and other components of the composition of the present invention; and Delayed release of gases from microbubbles so that oxygen can be dispersed throughout a liquid rather than just at the point of introduction.

With either mechanism, it is likely that the tendency of composition of the present invention organizes into clusters, aggregates, or gas-filled bubbles provides a platform for reactions to occur by increasing localized concentrations of reactants, lowering the transition of energy required for a catalytic reaction to occur, or some other mechanism which has not yet been described. It has been established that the non-ionic surfactants used in the composition of the present invention are compatible with and enhance enzymatic reactions. The composition of the present invention has catalytic activities that is more like the catalytic activities of functionalized surfactants than conventional enzyme systems.

The composition of the present invention comprises a yeast fermentation supernatant, preservatives and a non-ionic surfactant, in the absence of an anionic or cationic surfactant.

Non-ionic surfactants suitable for use in the present invention include, but are not limited to, polyether non-ionic surfactants comprising fatty alcohols, alkyl phenols, fatty acids and fatty amines which have been ethoxylated; polyhydroxyl non-ionic (polyols) typically comprising sucrose esters, sorbital esters, alkyl glucosides and polyglycerol esters which may or may not be ethoxylated. In one embodiment of the present invention a surfactant of the general formulae:

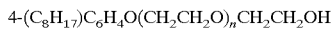

$$4\text{-}(C_8H_{17})C_6H_4O(CH_2CH_2O)_nCH_2CH_2OH$$

and in particular an ethoxylated octyl phenol which is sold under the tradename IGEPAL CA-630, is used. The non-ionic surfactant acts synergistically to enhance the action of the yeast fermentation supernatant.

The composition of the present invention is similar to that described in U.S. Pat. No. 3,635,797 to Battistoni et al. Briefly, yeast, *Saccharomyces cerevisiae*, is cultured in a medium comprising: a sugar source, such as sucrose from molasses, raw sugar, soy beans or mixtures thereof. A sugar concentration of about 10 to about 30%, by weight; malt such as diastatic malt at a concentration of about 7 to about 12%, by weight; a salt, such as magnesium salts, and in particular magnesium sulfate, at a concentration of about 1 to about 3%, by weight, and yeast is added to the medium to a final concentration of about 1 to about 5%, by weight, is used. The mixture is incubated at about 26° to about 42° C. until the fermentation is completed, i.e. until effervescence of the mixture has ceased, usually about 2 to about 5 days depending on the fermentation temperature. At the end of the fermentation the yeast fermentation composition is centrifuged to remove the "sludge" formed during the fermentation. The supernatant (about 98.59%, by weight) is mixed with sodium benzoate (about 1%, by weight), imidazolidinyl urea (about 0.01%, by weight), diazolidinyl urea (about 0.15%, by weight), calcium chloride (about 0.25%, by weight) to form fermentation intermediate. The pH is adjusted to about 3.7 to about 4.2 with phosphoric acid. The composition of the fermentation intermediate is summarized in Table I.

TABLE I

Fermentation Intermediate

| Component | %, by weight |
|---|---|
| Fermentation supernatant | 98.59 |
| Na Benzoate | 1 |
| Imidazolidinyl urea | 0.01 |
| Diazolidinyl urea | 0.15 |
| Calcium chloride | 0.25 |
| Adjust pH | to about 3.7 to about 4.2 with phosphoric acid |

The fermentation intermediate is prepared by filling a jacketed mixing kettle with the desired quantity of the fermentation supernatant. With moderate agitation the pH is adjusted to about 3.7 to about 4.2 with phosphoric acid. With continuous agitation sodium benzoate, imidazolidinyl urea, diazolidinyl urea and calcium chloride are added. The temperature of the mixture is then slowly raised to about 40° C. and the mixture is agitated continuously. The temperature is maintained at about 40° C. for about one hour to ensure that all the components of the mixture are dissolved. The mixture is then cooled to about 20° to about 25° C.

The fermentation intermediate is then formulated into the composition of the present invention (final composition) by mixing the fermentation intermediate (about 20.24%, by weight, of the final composition) with, preservatives such as sodium benzoate, imidazolidinyl urea, diazolidinyl urea, imidazolidinyl urea, diazolidinyl urea and mixtures thereof (about 0.16%, by weight, of the final composition), a non-ionic surfactant such as ethoxylated octyl phenol (about 9%, by weight, of the final composition) and the composition is brought to 100% by the addition of water. In a preferred embodiment of the present invention the composition comprises about 20.24%, by weight, fermentation intermediate, about 0.1%, by weight, sodium benzoate, about 0.01%, by weight, imidazolidinyl urea, about 0.15%, by weight, diazolidinyl urea, about 9%, by weight, ethoxylated octyl phenol (see Table II).

TABLE II

Final Composition

| Component | % by weight |
|---|---|
| Sodium benzoate | 0.1 |
| Imidazolidinyl urea | 0.01 |
| Diazolidinyl urea | 0.15 |
| Ethoxylated octyl phenol | 9.00 |
| Fermentation Intermediate | 20.24 |

The method for preparing the final composition is to charge a mixing kettle with the desired volume of water at about 20° to about 25° C. Sodium benzoate, imidazolidinyl urea and diazolidinyl urea are added while the solution is agitated. The mixture is agitated until the solids are dispersed. Ethoxylated octyl phenol is then added and the agitation is continued. The fermentation intermediate is then added with gentle agitation. The pH is adjusted to about 3.5 to about 4.0 with phosphoric acid.

The final concentration of components in the final composition are summarized in Table III.

TABLE III

Final Composition

| Component | %, by weight |
|---|---|
| Na benzoate | 0.3 |
| Imidazolidinyl urea | 0.01 |
| Diazolidinyl urea | 0.15 |
| Ethoxylated octyl phenol | 9 |
| Calcium chloride | 0.05 |
| Fermentation supernatant | 20 (clarified) |
| Adjust pH | to about 3.5 to 4.0 with phosphoric acid |

The final composition is diluted for use. For use in waste-water the final composition is diluted to as high as parts per million. For other uses it may desirable to dilute the final composition only as little as 1 in 10. Those skilled in the art are aware that dilutions of such compositions can be used and that over-dilution for a particular purpose can result in a decreased rate of digestion and that under-dilution for a particular purpose increases cost without increasing the rate of degradation. Ideally, the final composition is diluted to optimize the rate of degradation of a particular waste and to minimize costs.

In use, the composition of the present invention enhances the degradation of pollutants, presumably, by enhancing the activity of bacteria commonly found in waste-water treatment plants and, unexpected, also enhances the dissolved oxygen in the waste-water. In the presence of bacteria it is expected that DO is decreased as the bacteria metabolize the available oxygen. The surfactant and yeast fermentation supernatant present in the final composition act synergistically to enhance the rate of degradation and to increasing DO. The surfactant alone or the yeast fermentation supernatant alone does not result in the enhanced activity observed when they are combined.

In use, the enhanced degradation observed with the final composition is proportional to the time that the final composition is in contact with the waste-water to be treated. Therefore, it is desirable that the final composition is added to the waste-water at the earliest opportunity. Preferably, the final composition is added upstream of the waste-water treatment plant. The final composition may be added to the waste-water by continuously pumping the final composition into the waste-water or it may be added in batches as desired to reach the desired dilution of the final composition in the waste-water.

EXAMPLE 1

Comparison of the Fermentation Intermediate of U.S. Pat. No. 3,635,797 and the Final Compound of the Present Invention The present invention is a modification of the fermentation composition described in U.S. Pat. No. 3,635,797. The fermentation intermediate of U.S. Pat. No. 3,635,797 and the composition of the present invention are set forth for comparison in Table IV.

TABLE IV

| Component | U.S. Pat. No. 3,635,797 Enzyme Formulation (%, by weight) | Finial Composition (%, by weight) |
|---|---|---|
| Na benzoate | 0 | 0.3 |
| Imidazolidinyl urea | 0 | 0.01 |
| Diazolidinyl urea | 0 | 0.15 |
| Anionic surfactants | 20 | 0 |
| Nonionic surfactants | 18 | 9 |
| Inorganic surfactants | 25 | 0 |
| Lactic acid | 9 | 0 |
| Citric acid | 1.7 | 0 |
| Urea | 40 | 0 |
| Pine oil | 3.5 | 0 |
| Fermentation supernatant | 22 | 20 (clarified) |
| Adjust pH | about 3.0 with citric acid | about 3.5 ot 4.0 with phosphoric acid |

The elimination of anionic surfactants and inorganic surfactants increased the performance of the final formulation in its ability to remove pollutants from waste-water. The addition of imidazolidinyl urea, diazolidinyl urea and sodium benzoate increased the stability of the final formulation by inhibiting degradation of the fermentation supernatant. Centrifugation to form the fermentation supernatant resulted in a decrease or elimination of particulate matter which lead to clogging of pumps and piping.

EXAMPLE 2

Soybean Fermentation Waste-Water Treatment Plant

This study was conducted at the Kikkoman Foods Inc. soy bean brewery in Walworth, Wisconsin which discharges pretreated water into the Fontana-Walworth Water Pollution Control Commission's facility. This plant treats approximately $3.8 \times 10^6$ of waste-water per day, of which the discharge from Kikkoman is about one-fifth of the total waste-water treated by the plant. Kikkoman is charged a surcharge based on the BOD and TSS discharged daily. The pretreatment is a biological process contained in two continuously stirred tanks that are mixed by continuous aeration. Kikkoman is permitted to discharge a maximum of 530 kg BOD and 396 kg TSS per day. The company is subject to fines if these numbers are exceeded.

Waste-water from the plant comprises process waste such as heated wheat and soy meal which contains high concentrations of starches and proteins and fermentation residue including soy cake and soy sauce which contains amino acids, sugar, lactic acid, fiber and vegetable oil.

The waste-water from the brewery was collected and passed through a 200 mesh screen to remove large solids. The waste-water was then treated in an aeration tank (757 m$^3$; 16 in diameter×4 m in depth) where the water was aerated at a rate of 29.5 l/min. using coarse bubble diffusers. Float activated pumps transferred the waste-water to a second aeration tank (2,270 m$^3$; 23 m×23 m×4 m in depth) where the water was aerated using a flexible membrane disc air diffuser at a rate of 44.7 l/min. The retention time for each tank was about 24 hr. The average waste discharge was about 700 m$^3$ per day. The composition of the present invention, was added manually to both tanks or by pumping a diluted solution into the tanks approximately 200 m upstream of the first aeration tank. An average of 17 l of the composition (20.24%, by weight, fermentation intermediate, about 9%, by weight, urea, about 0.15%, by weight, sodium benzoate, about 0.15%, by weight, imidazolidinyl urea, about 0.05%, by weight, diazolidinyl urea, about 9%, by weight, ethoxylated octyl phenol and about 62%, by weight, water) was added per day. The average concentration of the composition was 29.5 ppm with a minimum of 6.69 ppm and a maximum of 857.14 ppm.

The effluent was monitored for biochemical oxygen demand and total suspended solids, by methods well known to those skilled in the art.

The study was continued for a period of 52 weeks and the results of the study are set forth in Table V.

TABLE V

| | Effluent Quality | | |
|---|---|---|---|
| | Pre-treatment | Treatment with formula of U.S. Pat. No. 3,635,797 | Treatment with composition of the present invention |
| BOD Range | 620–750 | 260–420 | 175–250 |
| TSS Range | 920–1160 | 538–582 | Not tested |
| DO Range | 01–2.8 | 1.0–9.0 | 6.0–9.9 |

After treatment of the waste-water with the composition of the present invention, the dissolved oxygen increased about five fold and the strong odors that were associated with the aeration tanks were eliminated.

EXAMPLE 3

Treatment of Waste-water with Final Composition

A 200 ml waste-water sample was treated with 20 ml of composition of the present invention (20.24%, by weight, fermentation intermediate, about 9%, by weight, urea, about 0.15%, by weight, sodium benzoate, about 0.15%, by weight, imidazolidinyl urea, about 0.05%, by weight, diazolidinyl urea, about 9%, by weight, ethoxylated octyl phenol and about 62%, by weight, water) and aerated at room temperature for about one hour. The samples were analyzed before and after treatment. The "before" sample was diluted with 20 ml of water prior to treatment. The results are summarized in Table VI.

TABLE VI

| | Untreated (mg/l) | Treated (mg/l) |
|---|---|---|
| BOD[1] | 810 | 140 |
| TSS[2] | 380 | 48 |
| P[3] | 6.5 | 1.02 |
| FOG[4] | 58 | 18 |
| Arsenic | nd[5] | nd |
| Cadmium | 0.28 | nd |
| Copper | 3.5 | 0.18 |
| Lead | 4.0 | 0.22 |
| Nickel | 1.02 | nd |
| Chromium | 2.88 | 0.12 |
| Silver | nd | nd |
| Zinc | 10.8 | 0.22 |

[1]Biological Oxygen Demand
[2]Total Suspended Solids
[3]Phosphorous
[4]Fats, Oils and Grease
[5]Less than detectable levels The composition of the present invention was effective reducing BOD, TSS, phosphorous, FOG and many metals present in the waste-water sample. The addition of the final composition to the waste-water resulted in the precipitation of cadmium, copper, lead, nickel, chromium and zinc which resulted in the reduction of the concentration of these metals in the waste-water after treatment.

EXAMPLE 4

City Water Pollution Control

The waste-water control system received influent from Town 1 with a population of 2,000, Town 2 with a population of 1,500 and a Major Food Processor (MFP, the Kikkoman plant discussed above). The influent from these sources is shown in Table VII.

TABLE VII

|  | Town 1 | Town 2 | MFP |
|---|---|---|---|
| Ambient Air Temperature (°C.) | 10 | 10 | 10 |
| Flow (1/day × $10^{-6}$) | 2.12 | 0.68 | 0.79 |
| BOD (5 day average, kg/day) | 249.92 | 154.04 | 179.53 |
| TSS (kg/day) | 248.06 | 177.2 | 294.07 |

The plant into which the effluents flows was treated with 22.5 l of the enzyme formula described in U.S. Pat. No. 3,635,797, 15 l or 7.5 l of the composition of the present invention (20.24%, by weight, fermentation intermediate, about 9%, by weight, urea, about 0.15%, by weight, sodium benzoate, about 0.15%, by weight, imidazolidinyl urea, about 0.05%, by weight, diazolidinyl urea, about 9%, by weight, ethoxylated octyl phenol and about 62%, by weight, water). The results are summarized in Table VIII.

TABLE VIII

|  | No treatment | | 22.5 l of enzyme formula of U.S. Pat. No. 3,635,797 | | 15 l final composition | | 7.5 l final composition | |
|---|---|---|---|---|---|---|---|---|
|  | Inflow | Outflow | Inflow | Outflow | Inflow | Outflow | Inflow | Outflow |
| Flow (l/d × $10^{-6}$) | 3.4 | 3.4 | 3.4 | 3.4 | 3 | 3 | 3 | 3 |
| BOD (mg/l) | 152.8 | 1.6 | 128.3 | 1.5 | 111.5 | 2.4 | 126.4 | 2 |
| TSS (mg/l) | 197.6 | 2.2 | 176.2 | 2.6 | 169.9 | 4.3 | 173.1 | 3.3 |
| $PO_4$ (mg/l) | 5.8 | 4.4 | 5.5 | 3 | 4.8 | 2.8 | 4.4 | 3 |
| DO | 18.3 | 8.7 | 5.1 | 9.7 | 4.3 | 10.5 | 4.7 | 10.5 |
| Bacteria/ml × $10^{-6}$ | 12.9 | $5.9^5$ | 10.1 | $18^5$ | 3.4 | $6.5^1$ | 2.3 | $7.4^1$ |

[1]In-plant values, not effluent values

The treatment with each of the composition described above lead to a reduction in the BOD, TSS and phosphate and an increase in DO and the bacterial count.

EXAMPLE 5

Treatment of Manure

Manure for this study was collected from pigs fed on a corn based diet. The manure was scraped to a pit where the manure was agitated prior to testing. The diet use is set forth in Table IX.

TABLE IX

| Ingredient | kg |
|---|---|
| Corn, yellow, dent, US, All + 2 | 675 |
| Soybean meal, solv, grnd, 50% | 184.5 |
| Dicalcium Phosphate | 8.6 |
| Calcium Carbonate | 6.3 |
| Salt, iodized | 2.3 |
| Premix | 1.6 |

TABLE IX-continued

| Ingredient | kg |
|---|---|
| L-lysine HCl | 7.2 |
| Fat | 18 |

Columns (38 cm diameter×122 cm height) were filled to a maximum of 91 cm of manure leaving a minimum gas head space of 30 cm. Thirty cm of manure were added to the column on day 1 and an additional 15 cm was added on days 7, 14, 21 and 28. Air was exhausted from test and control columns at a rate of 236 cu cm/sec. The tests were run for 35 days. In the test columns the composition of the present invention (20.24%, by weight, fermentation intermediate, about 9%, by weight, urea, about 0.15%, by weight, sodium benzoate, about 0.15%, by weight, imidazolidinyl urea, about 0.05%, by weight, diazolidinyl urea, about 9%, by weight, ethoxylated octyl phenol and about 62%, by weight, water), diluted 1:20 with water, was added to the manure at a concentration of 2,000 ppm. The tests were conducted at a temperature ranging from 24° to 52° C.

The odor threshold showed an odor reduction by about 31%, from the 2nd to the 5th week of treatment. Aerial ammonia, aerial hydrogen sulfide, total solids and total volatile solids were unaffected by the treatment. Volatile fatty acids and oxygen demand were decreased, 10%, and 25%, respectively, in the test samples as compared to the control. This is consistent with a reduction in odor.

EXAMPLE 6

Testing Protocol for Lakes and Ponds

Natural lakes and ponds are ecosystems containing many kinds of organisms (biota) in dynamic balance. In a healthy aquatic ecosystem, there are three main categories of biotic components existing together in a balanced condition. The three categories of biota in balanced aquatic ecosystems are:

Primarily photosynthetic algae, and other aquatic plants to a lesser degree, utilizing solar energy to synthesize complex organic molecules from inorganic sources. Some producers also fix atmospheric nitrogen.

Herbivorous aquatic organisms which feed on the biomass of producer organisms and the carnivorous animals which feed on herbivores.

When producer and consumer organisms die, they become a food source for the decomposer organisms which degrade complex organic molecules making these components again available for the primary producers.

The productivity of a natural aquatic ecosystem is driven by the activity of photosynthetic aquatic organisms such as algae. The balance between producer, consumer, and degrader aquatic biota is regulated by the availability of carbonaceous material, nitrogen, phosphorus, and other inorganic nutrients. Balanced growth of biota can be lost if the availability of nutrients becomes excessive.

In natural aquatic ecosystems where the regulation of growth has been lost due to excessive nutrients or in manmade lakes and ponds where design parameters do not favor balanced ecosystems, excessive algal growth (blooms) occurs. Algal blooms are undesirable because they reduce water quality and the aesthetic value of freshwater lakes, ponds and impoundments associated with recreational facilities (i.e. parks and golf courses), decorative aquascapes, and business parks.

Changes in water quality associated with imbalanced growth in aquatic ecosystems include:

Accumulation of nutrients such as nitrogen and orthophosphate which regulate aquatic productivity.

Formation of unsightly floating mats of producer organisms (primarily algae).

Reduced dissolved oxygen levels, limiting the growth of consumer and degrader organisms required for maintaining a balanced ecosystem.

Odors associated with the accumulation of decaying biomass under oxygen limited conditions.

Reduced water clarity due to the accumulation of organic colloids, suspended solids, and pigments.

Deposition of organic sediments, leading to increased domination by aquatic weeds and eutrophic conditions that transform lakes to marshes and ultimately to dry land.

Algae are plant-like organisms ranging and size and complexity from microscopic single cells to more advanced forms resembling aquatic weed (Muskgrass). The general nutrient requirements for algae are inorganic:

Carbon from carbon dioxide ($CO_2$) or carbonate ($HCO_3^-$);

Nitrogen (primarily nitrate),

Phosphorus (orthophosphate); and

Trace elements including sulfur (as sulfate), sodium potassium, calcium, magnesium, iron, cobalt, and molybdenum.

Algal blooms tend to occur if the concentration of inorganic nitrogen and phosphorus exceed respective values of 0.03 mg/l and 0.01 mg/l. However, orthophosphate concentrations appears to play a greater role in limiting algal growth than nitrogen, because nitrogen is more readily available. For example, as much as 50% of the nitrogen in algal biomass in some fresh water lakes has been fixed directly from air which is comprised of 80% nitrogen.

Concentrations of the composition of the present invention as set forth in Table III above ranging from 10 to 1.0 ppm were added to lakes, ponds, and other types of freshwater impoundments to improve water quality by promoting a more balanced growth by aquatic biota. There is no evidence that composition of the present invention is an algacidal or directly control algal growth.

The composition of the present invention may contribute to improved water in a number of ways. Based on extensive waste-water testing and pre testing in lakes and ponds, the primary mechanisms for improved water quality include:

A more natural balance between producer and degrader organisms

Treatment with the composition of the present invention treatment favors the proliferation of non-filamentous degrader organisms with high potentials for growth and the oxidation of organic wastes. The proliferation of these organisms enhance the biological oxidation of organic material associated with odors, poor water clarity, and the accumulation of organic sediments. These organisms would also compete with algae for nutrients, such as nitrogen and phosphorus, which play a role in regulating balanced growth in aquatic ecosystems.

Increasing levels of dissolved oxygen at lake bottoms.

Increasing DO levels in lake bottoms stimulates the activity of degrader organisms to reduce the build-up of organic material in sediments. In addition, elevated DO levels favor the formation insoluble iron (ferric) salts of phosphate, effectively reducing the availability of phosphates for imbalanced algal growth. If iron becomes reduced from the ferric to ferrous state by declining DO, phosphates are released resulting in algal blooms.

Protocol

The purpose of the study was to determine the impact of the composition of the present invention on water quality through the two primary mechanisms listed above. This study also served to reveal additional potential modes of action contributing to the beneficial use of the composition of the present invention. Test methods are described below.

Test Lakes

Initially five unconnected lakes of comparable size, sun exposure, and known volume will be selected. The selected lakes should exhibit comparable signs of imbalanced algal growth. Three lakes were designated a test lake and received the composition of the present invention. The remaining two lakes served as untreated controls and receive a "placebo" treatment consisting of water. During the study two of the lakes, one test lake and one control lake, were dropped from the study.

Treatment

Treatment consisted of the composition of the present invention prepared by diluting approximately one hundredfold with tap water. The treatment solution was then broadcast over the entire surface of the lake with a chemical power sprayer to improve dispersion.

Dosage rate were based on the volume composition of the present invention (prior to dilution) and the estimated volume of the lake. The initial treatment was 5 ppm. Subsequent treatments were reduced to 1.0 ppm and were administered at monthly intervals for the duration of the study.

At each treatment time, the control lake received a placebo treatment consisting of water. The purpose of the placebo is to null any potential impact resulting from spraying a volume of water over lakes. The power sprayer was used to deliver the placebo to the control lake before its use for delivering the treatment to the test lake.

Test Parameters

At the beginning of the study (before treatment) and at weekly intervals during the first month of testing, both lakes were characterized. After the first month, the lakes were characterized at monthly intervals, immediately before the addition the addition of the composition of the present invention or placebo. Characterization of lakes consisted of making on-site observations or the collecting samples for laboratory analysis. Data was collected for the following parameters relating to water quality:

Nitrogen and Phosphorus

Collected lake water samples at a depth of 6 inches below the surface and immediately above bottom. Submitted samples for determinations of nitrogen and phosphorus to laboratory limits of detection of at least 0.03 mg/l and 0.01 mg/l, respectively for nitrogen and orthophosphate.

Iron

Samples were collected and submitted for laboratory analysis to determine total, ferric, and ferrous iron. Analytical methods may vary depending on required detection limits, yet to be determined.

Floating Algae and Other Aquatic Plants. Visually observe, photograph, and prepare notes detailing the relative incidence of surficial algal growth on both lakes.

Dissolved Oxygen. Using a field DO probe suspended from a 10 foot pole, determine DO at a depth of 6 inches below the lake surface and from just above the lake bottom.

Odor. Record odor levels at each of the four directions of the compass around both lakes. Collect one representative sample from each lake for odor evaluation at an off-site location. Odor was evaluated off-site by a "blind" odor panel consisting of at least three individuals.

Turbidity. Visually observe and record turbidity using a target lowered into the water.

Sediment. Monitor sludge depth by measuring distance to the lake bottom from a fixed reference point which can be related to grade level. If lake level appears to be constant, water level can be used as the reference point. If there were fluctuations in lake level, a level fine can be drawn across the lake to generate an artificial horizon from which depth can be measured.

Heterotrophic Plate Count. Collect water samples from just above the lake bottom or lake sediment and submit to a qualified laboratory for enumeration of aerobic, heterotrophic bacteria.

Water Temperature. Determine surface and bottom temperatures of lakes.

Weather Conditions. Using published values, maintain daily records of ambient temperature, precipitation, and cloud cover.

Dissolved Solids. Collect water samples for determinations of hardness, salinity, and specific gravity.

Irrigation and Fertilizer. Perform interviews to determine application days and rates of fertilizer to areas surrounding the lakes. Perform inquires to determine irrigation patterns in the vicinity of the lakes and whether irrigation impacts natural water levels of lakes.

The results of the study are summarized in Tables X to XII below:

TABLE X

POND STUDY

| | TREATED | | | | | CONTROL | | | | |
|---|---|---|---|---|---|---|---|---|---|---|
| | 5/16 | 6/4 | 6/25 | 8/6 | Change (%) | 5/16 | 6/4 | 6/25 | 8/6 | Change (%) |
| CFU[1] | 509.5 | 3400 | 5000 | 1025 | 101.18 | 215 | 4500 | 14000 | 8550 | 3876.74 |
| Ca | 27.50 | 23.00 | 24.50 | 23.75 | −13.64 | 32 | 22 | 26 | 27 | −15.63 |
| Mg | 16.00 | 16.00 | 18.00 | 17.00 | 6.25 | 18 | 18 | 19 | 19 | 5.56 |
| Na | 55.00 | 63.00 | 67.50 | 65.25 | 18.64 | 59 | 64 | 71 | 100 | 69.49 |
| Amm[2] | 0.12 | 0.25 | 0.22 | 0.23 | 100.00 | 0 | 0.24 | 0.25 | 0.38 | NA |
| Nitrate[3] | 0.20 | 0.08 | 0.07 | 0.07 | −63.75 | 0.19 | 0.06 | 0.04 | 0.09 | −52.63 |
| pH | 9.20 | 8.60 | 8.85 | 8.73 | −5.16 | 8.8 | 8.9 | 8.6 | 9 | 2.27 |
| Condcu[4] | 495.0 | 605.0 | 625.0 | 615.0 | 24.24 | 570 | 540 | 660 | 780 | 36.84 |
| BOD[5] | 12.00 | 8.50 | 11.50 | 10.00 | −16.67 | 19 | 7 | 18 | 19 | 0.00 |
| Orth[6] | 0.03 | 0.00 | 0.00 | 0.00 | −100.0 | 0 | 0 | 0 | 0 | 0.00 |
| Tot P[7] | 0.18 | 0.17 | 0.23 | 0.20 | 14.29 | 0.29 | 0.22 | 0.42 | 0.17 | −41.38 |
| Nitrate[8] | 0.00 | 0.00 | 0.00 | 0.00 | 0.00 | 0 | 0 | 0 | 0 | 0.00 |
| Kjl[9] | 3.35 | 3.75 | 5.05 | 4.40 | 31.34 | 3.9 | 3.9 | 7.7 | 9.9 | 153.85 |
| Organ-N[10] | 3.30 | 3.50 | 4.85 | 4.18 | 26.52 | 3.9 | 3.7 | 7.5 | 9.5 | 143.59 |
| Tot-N[11] | 3.55 | 3.85 | 5.10 | 4.48 | 26.06 | 4.1 | 4 | 7.8 | 10 | 143.90 |
| Turb[12] | 27.50 | 38.50 | 47.50 | 43.00 | 56.36 | 27 | 38 | 94 | 160 | 492.59 |
| Na Ad Ra | 2.10 | 2.45 | 2.50 | 2.48 | 17.86 | 2.1 | 2.4 | 2.5 | 3.6 | 71.43 |
| Fe | 0.105 | 0.14 | 0.14 | 0.13 | 26.19 | 0.12 | 0.05 | 0.51 | 0.32 | 166.67 |

[1]Colony forming unit
[2]Nitrogen as ammonia
[3]Nitrogen as nitrate
[4]Conductivity
[5]Biological oxygen demand
[6]Phosphate as orthophosphate
[7]Total phosphate
[8]Nitrogen as nitrite
[9]Kjldahl nitrogen
[10]Organic nitrogen
[11]Total nitrogen
[12]Turbidity The results of the study shown in Table X indicates that the use of the composition of the present invention lead to a decrease in the colony forming units, biological oxygen demand, orthophosphate, Kjldahl nitrogen, organic nitrogen, total nitrogen, turbidity and iron, compared to the control values.

TABLE XI

SUMMARY OF FIELD DATA

| Date | Pond | Treatment | Depth[1] | Temp[2] | DO[3] | pH | Secchi[4] (m) | COMMENTS |
|------|------|-----------|----------|---------|-------|-----|---------------|----------|
| 6-9 | 9 | + | 1 | 26.1 | 9.8 | 8.8 | 0.1 | Ponds were partially drained making it difficult to collect field profile data. Lake 9 contained Microcytis but also other species of green phytoplankton and some zooplankton. |
| 6-9 | 12 | + | 1 | 23.7 | 5.8 | 8.6 | 0.1 | Contained a dominance of Micorcystis (bluegreen). |
| 6-9 | 16 | Placebo | 1 | 24 | 5.7 | 8.6 | 0.1 | Contained a dominance of Microcysitis (bluegreen). |
| 24-7 | 9 | + | 0 | 29.9 | 7.7 | | 0.25 | All sampling pH determinations done at 12–15" below water surface. Small amounts of Lyngbya visible. Aquatic weeds around bank. |
| 24-7 | 9 | + | 1 | 29.8 | 7.7 | 8.8 | | |
| 24-7 | 9 | + | 2 | 29.6 | 7.1 | | | |
| 24-7 | 9 | + | 3 | 29.6 | 3.1 | | | Mud encountered at 3 ft. |
| 24-7 | 12 | + | 0 | 30.1 | 10.1 | | | Water level in pond down 8–12" due to lack of water replacement. Aeration initiated after treatment. Heavy Microcystis infestation. |
| 24-7 | 12 | + | 1 | 28.5 | 7.9 | 8.8 | 0.15 | |
| 24-7 | 12 | + | 2 | 28.1 | 4.6 | | | |
| 24-7 | 12 | + | 3 | NA | NA | NA | | Mud encountered at 3.0 ft. Large amounts of Spike Rush, as well as higher blue green algae (Lyngbya?) in gelatinous balls associated with malodors. Microcystis at lake surface. |
| 24-7 | 16 | Placebo | 0 | 29 | 6.8 | | 0.2 | Mud encountered at 3.0 ft. Large amounts of Spike Rush, as well as higher blue green algae (Lyngbya?) in gelatinous balls associated with malodors. Microcystis at lake surface. |
| 24-7 | 16 | Placebo | 1 | 28.3 | 5.5 | 8.6 | | |
| 24-7 | 16 | Placebo | 2 | 28.1 | 3.8 | | | |
| 24-7 | 16 | Placebo | 3 | NA | NA | | | |
| 25-6 | 9 | + | 0 | 26.3 | 6.4 | | | |
| 25-6 | 9 | + | 1 | 26.3 | 6.35 | 8.6 | 0.3 | |
| 25-6 | 9 | + | 2 | 26.2 | 6.1 | | | |
| 25-6 | 9 | + | 3 | NA | NA | | | |
| 25-6 | 12 | + | 0 | 26.3 | 7.9 | | | |
| 25-6 | 12 | + | 1 | 26.2 | 7.8 | 8.8 | 0.2 | |
| 25-6 | 12 | + | 2 | 25.9 | 6.8 | | | |
| 25-6 | 12 | + | 3 | NA | NA | | | |
| 25-6 | 16 | Placebo | 0 | 26.2 | 7.2 | | | |
| 25-6 | 16 | Placebo | 1 | 26 | 6 | 8.6 | 0.2 | |
| 25-6 | 16 | Placebo | 2 | 25.6 | 4.8 | | | |
| 25-6 | 16 | Placebo | 3 | 25.6 | 3.9 | | | |
| 4-6 | 9 | + | 0 | 27.5 | 6.5 | | | |
| 4-6 | 9 | + | 1 | 27.5 | 6.2 | NA | NA | |
| 4-6 | 9 | + | 2 | 27.5 | 6.3 | | | |
| 4-6 | 9 | + | 3 | 27.5 | 5.8 | | | |
| 4-6 | 12 | + | 0 | 27 | 8.3 | | | |
| 4-6 | 12 | + | 1 | 27 | 8.3 | NA | 0.4 | Ran out of pH test reagents. |
| 4-6 | 12 | + | 2 | 26.8 | 7.5 | | | |
| 4-6 | 12 | + | 3 | 26.7 | 6.4 | | | |
| 4-6 | 16 | Placebo | 0 | 27.1 | 8 | | | |
| 4-6 | 16 | Placebo | 1 | 27 | 8 | NA | 0.3 | |
| 4-6 | 16 | Placebo | 2 | 27 | 8 | | | |
| 4-6 | 16 | Placebo | 3 | 26.9 | 7.2 | | | |

TABLE XI-continued

SUMMARY OF FIELD DATA

| Date | Pond | Treatment | Depth[1] | Temp[2] | DO[3] | pH | Secchi[4] (m) | COMMENTS |
|------|------|-----------|----------|---------|-------|------|-------|----------|
| 16-5 | 9 | + | 0 | 30.2 | 10.3 | | | |
| 16-5 | 9 | + | 1 | 29.9 | 10.4 | NA | 0.25 | |
| 16-5 | 9 | + | 2 | 29.6 | 10.4 | | | |
| 16-5 | 9 | + | 3 | 29.4 | 10.5 | | | |
| 16-5 | 12 | + | 0 | 29.6 | 9.7 | | | |
| 16-5 | 12 | + | 1 | 29.4 | 10 | 8.5 | 0.3 | |
| 16-5 | 12 | + | 2 | 27.4 | 7.9 | | | |
| 16-5 | 12 | + | 3 | NA | NA | | | Mud encountered at 3 ft. |
| 16-5 | 16 | Placebo | 0 | 29.6 | 9.8 | | | |
| 16-5 | 16 | Placebo | 1 | 28.3 | 8.6 | 8.4 | | |
| 16-5 | 16 | Placebo | 2 | 27.7 | 7.7 | | | |
| 16-5 | 16 | Placebo | 3 | 27.1 | 4.4 | | | Mud encountered at 3 ft. |

[1]Feet
[2]C.°
[3]ppm
[4]Secchi disc measure for turbidity

TABLE XII

DO in Treated and Control Lakes
(DO 1 ft. below the surface of the lake)

| Date | DO in Treated Lake | DO in Control Lake |
|------|--------------------|--------------------|
| 16-5 | 10.2 | 8.6 |
| 5-6 | 7.3 | 8 |
| 25-6 | 7.1 | 6 |
| 24-7 | 7.8 | 5.5 |
| 6-8 | 7.8 | 5.7 |

The results indicate that the dissolved oxygen was maintained at a higher level in the lakes treated with the composition of the present invention than in the control lakes.

EXAMPLE 7

Treatment of Ponds

Nine ponds were treated as follows:

Three ponds (designated 1, 2 and 3) were treated with a low dose of the composition of the present invention as set forth in Table III above were treated with 2.0 ppm per month;

Three ponds (designated 4, 5 and 6) were treated with a high dose of the composition of the present invention as set forth in Table III above were treated with 2.0 ppm per week; and Three ponds (designated 7, 9 and 9) were used as a control and 2.0 ppm of a placebo (water) were added per week.

A summary of the results for dissolved oxygen are given in Table XIII.

TABLE XIII

DISSOLVED OXYGEN

| Date | Placebo | 2 ppm | 8 ppm |
|------|---------|-------|-------|
| 8-5 | 7.1 | 6.8 | 6.9 |
| 16-5 | 8.1 | 5.5 | 6.4 |
| 30-5 | 4.9 | 4.3 | 5.7 |
| 13-6 | 6.1 | 5.5 | 6.4 |
| 27-6 | 4.6 | 4.3 | 5.5 |
| 11-7 | 4.1 | 4.8 | 4.8 |
| 25-7 | 3.1 | 3.9 | 3.7 |
| 8-8 | 2.9 | 3.7 | 5 |
| 22-8 | 4.7 | 5.2 | 5.4 |

The results indicate that the dissolved oxygen was maintained at a higher level in the lakes treated with the composition of the present invention than in the control lakes.

The field results are presented in Tables XIVA to I.

TABLE XIV-A

Date: 5/8/96; Air Temperature: 20° C.; Water Temperature: 25° C.

| Pond | DO[1] | pH | Cond[2] | C.O.D.[3] mg/l | B.O.D. mg/l | SRP[4] mg/l | TAN[5] mg/l | NO$_3$ mg/l | Chl-a[6] (μg/l) |
|------|------|-----|---------|----------------|-------------|-------------|-------------|-------------|-----------------|
| 7 | 7.2 | 8.2 | 50 | 7.78 | 3.60 | 0.002 | 0.041 | 0.000 | 4.988 |
| 8 | 6.2 | 8.0 | 70 | 2.22 | 7.80 | 0.003 | 0.031 | 0.000 | 6.598 |
| 9 | 7.8 | 7.9 | 40 | 7.78 | 3.00 | 0.002 | 0.052 | 0.000 | 1.363 |
| Ave. | 7.1 | 8.0 | 53.3 | 5.9 | 4.8 | 0.0 | 0.0 | 0.000 | 4.3 |
| 4 | 5.4 | 8.0 | 110 | 16.67 | 7.2 | 0.009 | 0.973 | 0.000 | 9.338 |
| 5 | 7.2 | 8.0 | 50 | 2.22 | 5.40 | 0.009 | 0.967 | 0.000 | 21.576 |
| 6 | 7.8 | 8.1 | 50 | 3.33 | 3.00 | 0.002 | 0.067 | 0.031 | 1.320 |
| Ave. | 6.8 | 8.0 | 70.0 | 7.4 | 5.2 | 0.0 | 0.1 | 0.000 | 10.7 |

TABLE XIV-A-continued

Date: 5/8/96; Air Temperature: 20° C.; Water Temperature: 25° C.

| Pond | $DO^1$ | pH | $Cond^2$ | $C.O.D.^3$ mg/l | B.O.D. mg/l | $SRP^4$ mg/l | $TAN^5$ mg/l | $NO_3$ mg/l | $Chl\text{-}a^6$ (µg/l) |
|---|---|---|---|---|---|---|---|---|---|
| 1 | 5.2 | 7.7 | 120 | 4.44 | 4.80 | 0.009 | 0.492 | 0.031 | 4.046 |
| 2 | 7.6 | 7.9 | 60 | 2.22 | 5.40 | 0.177 | 0.120 | 0.005 | 1.334 |
| 3 | 7.8 | 7.8 | 60 | 1.11 | 3.60 | 0.002 | 0.043 | 0.000 | 1.276 |
| Ave. | 6.9 | 7.8 | 80.0 | 2.6 | 4.6 | 0.1 | 0.2 | 0.0 | 2.2 |

[1] Dissolved oxygen
[2] Conductivity
[3] Chemical oxygen demand
[4] Soluble recoverable phosphate
[5] Total ammonia nitrogen
[6] Chlorophyll a

TABLE XIV-B

Date: 5/16/96; Air Temperature: 20° C.; Water Temperature: 25° C.

| Pond | DO | pH | Cond | C.O.D. mg/l | B.O.D. mg/l | SRP mg/l | TAN mg/l | NO3 mg/l | Chl-a (µg/l) |
|---|---|---|---|---|---|---|---|---|---|
| 7 | 8.6 | 8.7 | 70 | 13.33 | 7.80 | 0.014 | 0.017 | 0.076 | 2.668 |
| 8 | 8.2 | 8.5 | 80 | 4.44 | 7.80 | 0.159 | 0.016 | 0.135 | 4.046 |
| 9 | 7.4 | 8.6 | 50 | 6.67 | 5.40 | 0.020 | 0.012 | 0.065 | 6.670 |
| Ave. | 8.1 | 8.6 | 66.7 | 8.1 | 7.0 | 0.1 | 0.0 | 0.1 | 4.5 |
| 4 | 5.4 | 7.6 | 130 | 22.22 | 7.20 | 0.080 | 0.024 | 0.000 | 13.630 |
| 5 | 3.8 | 7.8 | 80 | 11.11 | 7.80 | 0.086 | 0.227 | 0.043 | 5.336 |
| 6 | 7.4 | 8.6 | 60 | 10.00 | 5.40 | 0.012 | 0.001 | 0.043 | 8.178 |
| Ave. | 5.5 | 8.0 | 90.0 | 14.4 | 6.8 | 0.1 | 0.1 | 0.0 | 9.0 |
| 1 | 4.2 | 7.7 | 130 | 11.11 | 7.20 | 0.015 | 0.179 | 0.054 | 16.356 |
| 2 | 7.8 | 8.4 | 70 | 2.22 | 6.00 | 0.017 | 0.008 | 0.059 | 5.220 |
| 3 | 7.2 | 8.3 | 70 | 5.56 | 7.20 | 0.118 | 0.026 | 0.000 | 1.320 |
| Ave. | 6.4 | 8.1 | 90.0 | 6.3 | 6.8 | 0.0 | 0.1 | 0.0 | 7.6 |

TABLE XIV-C

Date: 5/30/96; Air Temperature: 23° C.; Water Temperature: 25° C.

| Pond | DO | pH | Cond | C.O.D. mg/l | B.O.D. mg/l | SRP mg/l | TAN mg/l | $NO_3$ mg/l | Chl-a (µg/l) |
|---|---|---|---|---|---|---|---|---|---|
| 7 | 6.0 | 7.7 | 80 | 4.49 | 4.80 | 0.030 | 0.016 | 0.011 | 10.092 |
| 8 | 4.2 | 7.7 | 90 | 7.87 | 6.00 | 0.041 | 0.022 | 0.011 | 3.872 |
| 9 | 4.6 | 7.6 | 60 | 4.49 | 2.40 | 0.041 | 0.025 | 0.000 | 0.000 |
| Ave. | 4.9 | 7.7 | 76.7 | 5.6 | 4.4 | 0.0 | 0.0 | 0.0 | 4.7 |
| 4 | 4.2 | 7.7 | 130 | 7.87 | 5.40 | 0.035 | 0.259 | 0.070 | 10.672 |
| 5 | 3.8 | 7.8 | 80 | 3.37 | 5.40 | 0.042 | 0.331 | 0.011 | 13.195 |
| 6 | 4.8 | 7.8 | 60 | 4.49 | 4.20 | 0.027 | 0.028 | 0.054 | 6.018 |
| Ave. | 4.3 | 7.8 | 90.0 | 5.2 | 5.0 | 0.0 | 0.2 | 0.0 | 10.0 |
| 1 | 5.8 | 7.8 | 90 | 1.12 | 4.80 | 0.041 | 0.023 | 0.005 | 23.490 |
| 2 | 6.4 | 7.6 | 70 | 1.12 | 4.80 | 0.044 | 0.002 | 0.032 | 3.872 |
| 3 | 5.0 | 7.6 | 60 | 2.25 | 6.00 | 0.065 | 0.029 | 0.022 | 11.745 |
| Ave. | 5.7 | 7.7 | 73.3 | 1.5 | 5.2 | 0.0 | 0.0 | 0.0 | 13.0 |

TABLE XIV-D

Date: 6/13/96; Air Temperature: 21° C.; Water Temperature: 28° C.

| Pond | DO | pH | Cond | C.O.D. mg/l | B.O.D. mg/l | SRP mg/l | TAN mg/l | $NO_3$ mg/l | Chl-a (µg/l) |
|---|---|---|---|---|---|---|---|---|---|
| 7 | 6.4 | 8.4 | 80 | 8.16 | 5.40 | 0.011 | 0.025 | 0.065 | 6.090 |
| 8 | 6.8 | 8.2 | 80 | 31.63 | 1.20 | 0.012 | 0.008 | 0.054 | 6.960 |
| 9 | 5.0 | 8.1 | 60 | 6.12 | 3.60 | 0.020 | 0.028 | 0.043 | 20.460 |

TABLE XIV-D-continued

Date: 6/13/96; Air Temperature: 21° C.; Water Temperature: 28° C.

| Pond | DO | pH | Cond | C.O.D. mg/l | B.O.D. mg/l | SRP mg/l | TAN mg/l | $NO_3$ mg/l | Chl-a ($\mu$g/l) |
|---|---|---|---|---|---|---|---|---|---|
| Ave. | 6.1 | 8.2 | 73.3 | 15.3 | 3.4 | 0.0 | 0.0 | 0.1 | 11.2 |
| 4 | 4.2 | 7.4 | 140 | 6.12 | 2.40 | 0.015 | 0.017 | 0.076 | 24.070 |
| 5 | 5.6 | 7.5 | 80 | 4.08 | 3.00 | 0.011 | 0.804 | 0.097 | 13.558 |
| 6 | 6.8 | 8.4 | 7 | 5.10 | 3.00 | 0.008 | 0.014 | 0.054 | 9.628 |
| Ave. | 5.5 | 7.8 | 96.7 | 5.1 | 2.8 | 0.0 | 0.3 | 0.1 | 15.8 |
| 1 | 5.2 | 7.6 | 70 | 4.08 | 3.00 | 0.009 | 0.013 | 0.054 | 16.530 |
| 2 | 7.2 | 8.0 | 70 | 5.10 | 1.20 | 0.011 | 0.000 | 0.059 | 6.960 |
| 3 | 6.8 | 8.0 | 60 | 4.08 | 1.20 | 0.056 | 0.013 | 0.059 | 4.930 |
| Ave. | 6.4 | 7.9 | 66.7 | 4.4 | 1.8 | 0.0 | 0.0 | 0.1 | 9.5 |

TABLE XIV-E

Date: 6/27/96; Air Temperature: 25° C.; Water Temperature: 29° C.

| Pond | DO | pH | Cond | C.O.D. mg/l | B.O.D. mg/l | SRP mg/l | TAN mg/l | $NO_3$ mg/l | Chl-a ($\mu$g/l) |
|---|---|---|---|---|---|---|---|---|---|
| 7 | 4.8 | 7.2 | 80 | 27.78 | 5.40 | 0.000 | 0.110 | 0.097 | 25.201 |
| 8 | 4.4 | 7.1 | 80 | 3.33 | 0.60 | 0.011 | 0.100 | 0.059 | 16.646 |
| 9 | 4.6 | 7.3 | 70 | 22.22 | 0.30 | 0.012 | 0.102 | 0.005 | 72.210 |
| Ave. | 4.6 | 7.2 | 76.7 | 17.8 | 2.1 | 0.0 | 0.1 | 0.1 | 38.0 |
| 4 | 4.2 | 7.4 | 130 | 27.78 | 2.40 | 0.003 | 0.076 | 0.054 | 90.364 |
| 5 | 4.4 | 7.5 | 80 | 23.33 | 3.00 | 0.003 | 0.145 | 0.043 | 28.536 |
| 6 | 4.2 | 7.2 | 80 | 16.67 | 1.80 | 0.005 | 0.116 | 0.049 | 42.804 |
| Ave. | 4.3 | 7.4 | 96.7 | 22.6 | 2.4 | 0.0 | 0.1 | 0.0 | 53.9 |
| 1 | 4.4 | 7.5 | 80 | 11.11 | 3.00 | 0.008 | 0.121 | 0.032 | 51.040 |
| 2 | 5.8 | 7.2 | 70 | 21.11 | 0.60 | 0.015 | 0.118 | 0.011 | 39.440 |
| 3 | 6.4 | 7.3 | 70 | 10.00 | 1.20 | 0.024 | 0.096 | 0.016 | 9.512 |
| Ave. | 5.5 | 7.3 | 73.3 | 14.1 | 1.6 | 0.0 | 0.1 | 0.0 | 33.3 |

TABLE XIV-F

Date: 7/11/96; Air Temperature: 22.5° C.; Water Temperature: 28° C.

| Pond | DO | pH | Cond | C.O.D. mg/l | B.O.D. mg/l | SRP mg/l | TAN mg/l | $NO_3$ mg/l | Chl-a ($\mu$g/l) |
|---|---|---|---|---|---|---|---|---|---|
| 7 | 3.2 | 7.3 | 130 | 13.25 | 3.60 | 0.008 | 0.219 | 0.043 | 35.728 |
| 8 | 4.8 | 7.3 | 100 | 18.07 | 4.80 | 0.035 | 0.120 | 0.076 | 18.289 |
| 9 | 4.4 | 7.4 | 90 | 19.28 | 4.20 | 0.018 | 0.137 | 0.086 | 69.600 |
| Ave. | 4.1 | 7.3 | 106.7 | 16.9 | 4.2 | 0.0 | 0.2 | 0.1 | 41.2 |
| 4 | 5.0 | 7.2 | 270 | 45.78 | 10.80 | 0.009 | 0.176 | 0.200 | 91.872 |
| 5 | 5.2 | 7.4 | 150 | 39.76 | 6.00 | 0.005 | 0.154 | 0.049 | 71.340 |
| 6 | 4.2 | 7.4 | 100 | 16.87 | 3.00 | 0.006 | 0.302 | 0.135 | 44.931 |
| Ave. | 4.8 | 7.3 | 173.3 | 34.1 | 6.6 | 0.0 | 0.2 | 0.1 | 69.4 |
| 1 | 4.0 | 7.3 | 130 | 13.25 | 2.40 | 0.020 | 0.196 | 0.076 | 36.540 |
| 2 | 4.8 | 7.3 | 100 | 7.23 | 0.60 | 0.012 | 0.119 | 0.292 | 0.000 |
| 3 | 5.6 | 7.3 | 100 | 6.02 | 4.20 | 0.005 | 0.073 | 0.059 | 891.054 |
| Ave. | 4.8 | 7.3 | 110.0 | 8.8 | 2.4 | 0.0 | 0.1 | 0.1 | 309.2 |

TABLE XIV-G

Date: 7/25/96; Air Temperature: 23° C.; Water Temperature: 27° C.

| Pond | DO | pH | Cond | C.O.D. mg/l | B.O.D. mg/l | SRP mg/l | TAN mg/l | $NO^3$ mg/l | Chl-a ($\mu$g/l) |
|---|---|---|---|---|---|---|---|---|---|
| 7 | 3.0 | 7.3 | 110 | 20.69 | 8.40 | 0.002 | 0.389 | 0.005 | 85.912 |
| 8 | 3.0 | 7.2 | 90 | 20.69 | 6.60 | 0.000 | 0.000 | 0.000 | -22.910 |
| 9 | 3.4 | 7.2 | 80 | 28.74 | 7.80 | 0.000 | 0.325 | 0.000 | 53.341 |
| Ave. | 3.1 | 7.2 | 93.3 | 23.4 | 7.6 | 0.0 | 0.2 | 0.0 | 38.4 |
| 4 | 4.4 | 7.3 | 130 | 16.09 | 6.00 | 0.018 | 0.731 | 0.146 | 82.167 |
| 5 | 3.2 | 7.4 | 100 | 37.93 | 11.40 | 0.000 | 0.415 | 0.097 | 163.676 |
| 6 | 4.2 | 7.3 | 90 | 25.29 | 20.40 | 0.000 | 0.114 | 0.005 | 53.205 |

TABLE XIV-G-continued

Date: 7/25/96; Air Temperature: 23° C.; Water Temperature: 27° C.

| Pond | DO | pH | Cond | C.O.D. mg/l | B.O.D. mg/l | SRP mg/l | TAN mg/l | $NO^3$ mg/l | Chl-a ($\mu$g/l) |
|---|---|---|---|---|---|---|---|---|---|
| Ave. | 3.9 | 7.3 | 106.7 | 26.4 | 12.6 | 0.0 | 0.4 | 0.1 | 99.7 |
| 1 | 5.0 | 7.4 | 80 | 19.54 | 6.60 | 0.000 | 0.044 | 0.092 | 76.560 |
| 2 | 2.4 | 7.2 | 100 | 19.54 | 10.80 | 0.340 | 0.035 | 0.092 | 79.267 |
| 3 | 3.8 | 7.2 | 100 | 21.84 | 7.80 | 0.041 | 0.125 | 0.000 | 45.820 |
| Ave. | 3.7 | 7.3 | 93.3 | 20.3 | 8.4 | 0.1 | 0.1 | 0.1 | 67.2 |

TABLE XIV-H

Date: 8/8/96; Air Temperature: 25° C.; Water Temperature: 29° C.

| Pond | DO | pH | Cond | C.O.D. mg/l | B.O.D. mg/l | SRP mg/l | TAN mg/l | $NO_3$ mg/l | Chl-a ($\mu$g/l) |
|---|---|---|---|---|---|---|---|---|---|
| 7 | 2.2 | 7.1 | 110 | 28.57 | 10.80 | 0.011 | 0.363 | 0.026 | 96.831 |
| 8 | 2.6 | 7.1 | 110 | 26.19 | 16.80 | 0.045 | 0.000 | 0.046 | 130.036 |
| 9 | 3.8 | 7.1 | 90 | 30.95 | 7.80 | 0.060 | 0.392 | 0.036 | 74.646 |
| Ave. | 2.9 | 7.1 | 103.3 | 28.6 | 11.8 | 0.0 | 0.3 | 0.0 | 100.5 |
| 4 | 5.2 | 7.1 | 150 | 17.86 | 5.40 | 0.032 | 0.739 | 0.117 | 28.014 |
| 5 | 2.2 | 7.2 | 110 | 48.81 | 7.20 | 0.020 | 0.399 | 0.046 | 73.080 |
| 6 | 3.8 | 7.1 | 100 | 38.10 | 7.20 | 0.015 | 0.000 | 0.051 | 111.215 |
| Ave. | 3.7 | 7.1 | 120.0 | 34.9 | 6.6 | 0.0 | 0.4 | 0.1 | 70.8 |
| 1 | 7.4 | 7.4 | 80 | 28.57 | 7.80 | 0.021 | 0.000 | 0.041 | 206.886 |
| 2 | 3.4 | 7.1 | 100 | 27.38 | 13.80 | 0.012 | 0.000 | 0.122 | 155.788 |
| 3 | 4.2 | 7.0 | 100 | 25.00 | 10.80 | 0.062 | 0.000 | 0.245 | 131.196 |
| Ave. | 5.0 | 7.2 | 93.3 | 27.0 | 10.8 | 0.0 | 0.0 | 0.1 | 164.6 |

TABLE XIV-I

Date: 8/22/96; Air Temperature: 25° C.; Water Temperature: 29° C.

| Pond | DO | pH | Cond | C.O.D. mg/l | B.O.D. mg/l | SRP mg/l | TAN mg/l | $NO_3$ mg/l | Chl-a ($\mu$g/l) |
|---|---|---|---|---|---|---|---|---|---|
| 7 | 6.1 | 7.2 | 100 | 43.53 | — | 0.021 | 0.422 | 0.082 | 216.775 |
| 8 | 4.5 | 7.2 | 100 | 27.06 | — | 0.041 | 0.000 | 0.031 | 115.884 |
| 9 | 3.4 | 7.1 | 90 | 34.12 | — | 0.029 | 0.673 | 0.153 | 1574.352 |
| Ave. | 4.7 | 7.2 | 96.7 | 34.9 | — | 0.0 | 0.4 | 0.1 | 635.7 |
| 4 | 5.9 | 7.2 | 130 | 20.00 | — | 0.627 | 1.191 | 0.209 | 105.792 |
| 5 | 6.3 | 7.2 | 100 | 28.24 | — | 0.030 | 1.398 | 0.066 | 79.605 |
| 6 | 3.3 | 7.1 | 110 | 31.76 | — | 0.316 | 0.861 | 0.066 | 89.958 |
| Ave. | 5.2 | 7.2 | 113.3 | 26.7 | — | 0.3 | 1.2 | 0.1 | 91.8 |
| 1 | 5.7 | 7.3 | 100 | 37.65 | — | 0.174 | 0.949 | 0.918 | 43.152 |
| 2 | 4.5 | 7.1 | 110 | 28.24 | — | 0.045 | 0.678 | 0.051 | 61.132 |
| 3 | 5.9 | 7.1 | 120 | 35.29 | — | 0.014 | 0.607 | 0.066 | 91.466 |
| Ave. | 5.4 | 7.2 | 110.0 | 33.7 | — | 0.1 | 0.7 | 0.3 | 65.3 |

The present invention is not to be limited to the specific embodiments shown which are merely illustrative. Various and numerous other embodiments may be devised by one skilled in the art without departing from the spirit and scope of this invention.

What is claimed is:

1. A composition for the treatment of municipal and industrial waste-water comprising about 20%, by weight, of a fermentation supernatant comprising active enzymes from a *Saccharomyces cerevisiae* culture; about 0.3%, by weight, sodium benzoate; about 0.01%, by weight, imidazolidinyl urea; about 0.15%, by weight, diazolidinyl urea; and about 9%, by weight, of a non-ionic surfactant of the general formulae 4-$(C_8H_{17})C_6H_4O(CH_2CH_2O)_nCH_2CH_2OH$ in the absence of urea or saponins.

2. A composition for the treatment of municipal and industrial waste-water consisting essentially of a fermentation supernatant containing active enzymes from a *Saccharomyces cerevisiae* culture; preservatives selected from the group consisting of sodium benzoate, imidazolidinyl urea, diazolidinyl urea and mixtures thereof; calcium chloride; and a non-ionic surfactant of the general formulae 4-$(C_8H_{17})C_6H_4O(CH_2CH_2O)_nCH_2CH_2OH$.

3. A composition as recited in claim 2 wherein the preservatives are present at a concentration of about 0.46%, by weight; the surfactant is present at a concentration of about 9%, by weight; and the fermentation supernatant is present at a concentration of about 20%, by weight.

4. A composition as recited in claim 2 wherein the preservatives are present at a concentration of about 0.46%, by weight; the non-ionic surfactant is present at a concentration of about 9%, by weight; and the fermentation supernatant is present at a concentration of about 20%, by weight.

5. A composition for the treatment of municipal and industrial waste-water consisting essentially of about 20%, by weight, of a fermentation supernatant containing active enzymes from a *Saccharomyces cerevisiae* culture; about 0.3%, by weight, sodium benzoate; about 0.25%, by weight, calcium chloride; about 0.01%, by weight, imidazolidinyl urea; about 0.15%, by weight, diazolidinyl urea; and about 9%, by weight, of a non-ionic surfactant of the general formulae 4-$(C_8H_{17})C_6H_4O(CH_2CH_2)_nCH_2CH_2OH$.

* * * * *